April 19, 1966  C. L. ROBINSON  3,246,695
METHOD FOR HEATING MINERALS IN SITU
WITH RADIOACTIVE MATERIALS
Filed Aug. 21, 1961  2 Sheets-Sheet 1

Charles L. Robinson
INVENTOR.

BY Robert A. White
ATTORNEY

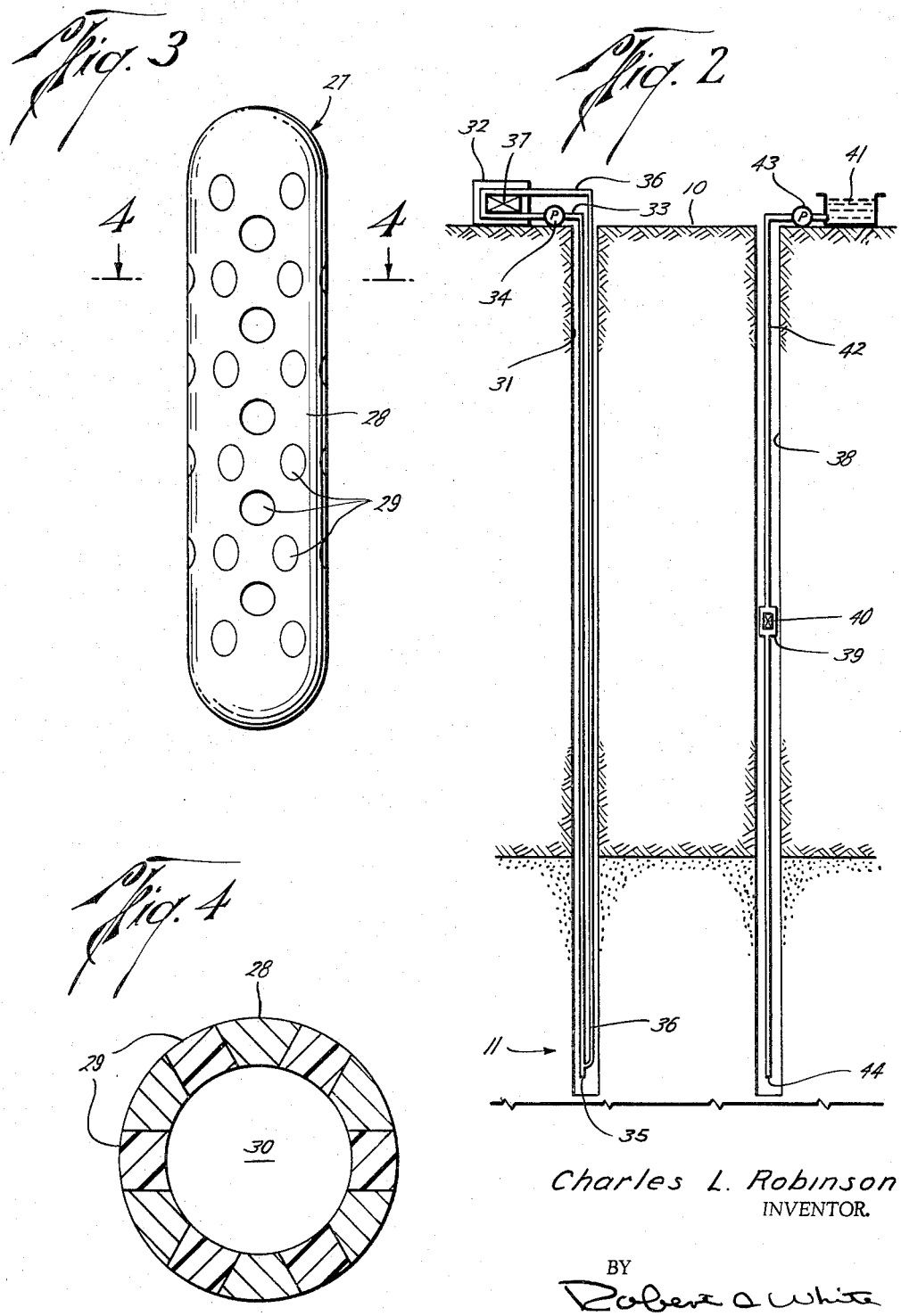

3,246,695
METHOD FOR HEATING MINERALS IN SITU WITH RADIOACTIVE MATERIALS
Charles L. Robinson, 4959 Yarwell, Houston, Tex.
Filed Aug. 21, 1961, Ser. No. 132,870
1 Claim. (Cl. 166—25)

My present invention relates to methods for heating minerals in situ through the use of radioactive materials. It is disclosed herein in its relation to the field of petroleum production, but it is to be understood that this example is illustrative and not exclusionary.

It is well known in the petroleum industry that there are vast reservoirs of petroleum in the earth which have not been produced because of the high viscosity of the hydrocarbon compounds trapped therein. Such reserves have been impossible or extremely difficult to extract on an economically feasible basis with presently available equipment, and thus have remained in place.

Much time and attention have been devoted to the capture of these valuable resources, and many have appreciated the fact that increasing the temperature of the minerals will lower their viscosity sufficiently to bring them within the capabilities of conventional production equipment. However, through the present time, no one has come forward with a proposal which renders it economically feasible to fully exploit the presently known reserves which are characterized by extremely high viscosity.

In recent years, the problem of disposing of the radioactive wastes which are the by-products of controlled nuclear reactions has become increasingly acute. Studies now in progress are directed to the feasibility of introducing such materials into the earth through the presently useless wells previously drilled for mineral exploration and production. A proposal of this type is attractive because it affords a relatively economical avenue by which the dangerous radiations of the waste material can be imprisoned within the earth where the contamination of the atmosphere and harmful effects to organisms subjected to its influence are eliminated.

My invention affords a solution to both of the foregoing problems. It contemplates the introduction of radioactive materials into the earth, not into barren or exhausted formations, but into the reservoirs of high viscosity petroleum which have heretofore remained unexploited. In such environments, the radiation of the material will serve the extremely useful purpose of increasing the temperature of the petroleum, thereby rendering possible or increasing the rate of its recovery.

It is to be understood that the introduction of radioactive materials into mineral bearing formations offers an extremely useful and versatile technique, for it may be used not only in formations containing high viscosity petroleum but also alone or in combination with other primary or secondary recovery techniques in any formation. Examples of the combination applications of my invention would be the heating of a subsurface reservoir to increase the rate of water injection, or to augment the effectiveness of in situ burning.

The inventions disclosed herein also have obvious utility in virtually all fields of mineral production, and it is to be understood that the term "mineral" is meant to include all of the hydrocarbon compounds embraced within the term petroleum, including both paraffin based oils and asphaltic based oils, as well as sulphur and any other naturally occuring substance which is subject to more ready capture at an elevated temperature.

For the purposes of my invention, it is not necessary to discuss in detail the nature of the phenomenon known as radiation. It is sufficient to point out that in the process which is identified as nuclear fission, atoms are broken into a number of fragments, consisting mainly of atoms of lighter weight than the source atom. Inherent in the process of nuclear fission as carried out in nuclear reactors is the production of large numbers of radio-isotopes of limited stability. The decay of these isotopes over a period of time is accompanied by the emission of radioactivity in various forms, and the absorption of such radiation by the surrounding materials generates large amounts of heat. It is this thermal energy which I propose to utilize by placing the radioactive material within the earth itself.

The operation of a nuclear reactor, of which there are many types, results in the activation of the materials which are used in the control of the process. The material thus activated may take the form of any of a large number of radioisotopes which vary in nature over a wide range. The property with which I am concerned is the rate at which such isotopes emit radiation, also known as the specific activity, and the rate of decay, that is, the rate at which the unstable isotopes progress toward a condition of stability. The rate of decay is frequently expressed in terms of "half life" of the isotope, which is the time required for the number of atoms of that particular isotope in a unit sample of the material to be reduced by one half.

The foregoing indicates that the materials which may be rendered radioactive for the purpose I propose are of almost infinite variety, and my invention contemplates the introduction of a material chosen from those readily available or which may be adapted for such use in accordance with the dictates of a number of factors such as the specific activity, half life and economic availability of the isotopes and the characteristics of the particular reservoir into which the material is to be introduced. The last-mentioned item in the case of petroleum recovery would involve the size and geological nature of the reservoir, the viscosity of the petroleum entrapped therein, the temperature increase which would be required to render recovery possible, and similar factors well known to those skilled in the art of reservoir engineering.

The formations in which my techniques would have ready applicability include those known as tar sand, oil shale and asphalt rock, all of which may be generally identified as bituminous rock. Such formations contain petroleum, usually in the form of heavy liquid, semi-solid and solid hydrocarbon residues which have been entrapped following the upward migration of their lighter fractions. Recovery of this material involves special considerations as to choice of isotope and manner of introduction, but the broad principles of utilization will be the same for all applications.

A highly significant factor to be considered in selecting the proper materials for heating the minerals in place is the form in which such materials are available. Radioactive wastes may be solid, liquid, or gas. Thus, the introduction of the material to the entrapped minerals requires special methods and/or appaartus for each case. In order to realize my object of confining radioactive materials in a location in which they cannot harm living organisms, continued control of the material is necessary. In other words, it would be extremely dangerous to introduce radioactive materials into a subsurface reservoir if the materials could find their way back to the surface of the ground, either through lateral or vertical migration or through the medium of the minerals subsequently produced as a result of the heat generated thereby.

With the foregoing general purposes and objectives in mind, attention is invited to my presently preferred methods and apparatus for practicing my invention as illustrated in the appended drawings in which:

FIG. 2 is a cross section of the earth similar to FIG. 1;

FIG. 3 is a container for radioactive materials intended for insertion into a mineral bearing formation; and FIG. 4 is a section along line 4—4 in FIG. 3.

Figure 1:
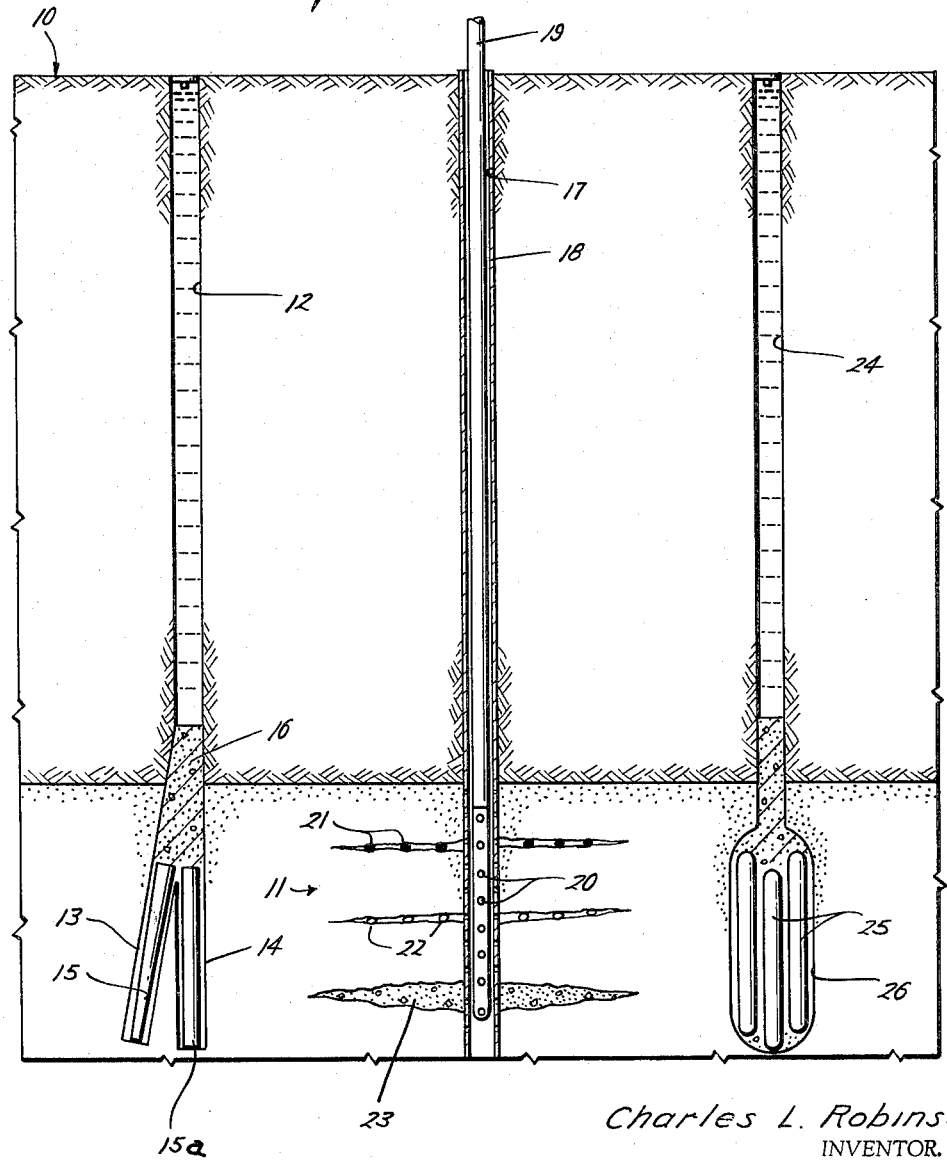
FIG. 1 is a cross section of the earth at a point where a reservoir of entrapped petroleum lies some distance below the surface.

FIG. 1 shows certain of my presently preferred methods for heating minerals in situ. Of the three bores extending from the surface of the earth 10 into the mineral bearing formation 11, the well indicated by reference numeral 12 discloses the use of radioactive material in solid form. The lower portion of well 12 has been divided into two sections 13 and 14 by well known techniques. As the use of the whipstock to create any number of holes inclined in various directions from a central well is a common practice in the drilling industry, the technique and apparatus required are not described herein. It is sufficient to point out that the cost of creating a number of lower end divergences of a well is relatively slight compared to the cost of drilling the central portion thereof, and the points of access to the material formation resulting therefrom provide a desirable method of placing a large amount of radioactive material in the formation in a well distributed pattern.

The arrangement exemplified by well 12 is suitable for the use of radioactive material in any form, but the elements 15 and 15a emplaced within the portions 13 and 14 are elongated units of solid radioactive material. A cement plug 16 is positioned above the elements 15 to shield the well bore from radiation. It is apparent that the radioactive material could be readily recovered at any time by the simple expedient of drilling through the plug 16 and grasping the elements with a proper down hole tool, and such recovery could be facilitated by tapering the elements. The element 15 in well bore 12 exemplifies such a configuration.

As indicated above, a large number of bottom hole sections such as appear in well 12 could be drilled, and these sections could be used in conjunction with any of the techniques discussed subsequently herein to heat a large portion of the producing formation.

The elements 15 may take the form of elongated rods, bars or similar shapes, and may be introduced into a producing formation directly from the surface instead of through the well, depending on the depth of the formation. Further, in soft formations, solid elements could be forced directly thereinto without drilling the portions 13 and 14.

When the radioactive material is consolidated in units of considerable size, little effort is required to retain control over the material so as to effect its removal from the earth at any time. In addition, there is no danger of migration of the material through the formation into a position where its radiation might be harmful. Considerations such as these represent certain advantages inherent in the use of large solid elements, but in many cases, convenience might dictate another choice.

A method of introducing solid material into the formation which offers several advantages involves the use of such material in pellet form. The demands of any particular installation would determine the size and shape of the pellets, but this type of material is attractive because, in proper form, it would circulate with some freedom through a proper formation, and re-entry of the radioactive pellets into the producing equipment could be readily prevented by a screen or perforated casing.

The use of radioactive materials in solid form offers several additional possibilities. For example, certain techniques have been developed for increasing the rate of recovery from petroleum bearing formations which involve rendering such formations more porous, as by hydraulic fracturing and by simultaneous or subsequent introduction of finely divided materials to hold or prop the formation open. The addition of radioactive pellets to such material would well serve the objects of both the propping and my invention, the heating of the minerals.

In many situations, the producing formation is opened by firing small projectiles thereinto from the well. The apparatus for this method is well known to those skilled in the art, and my invention would require only that the projectile be made wholly or in part from material rendered radioactive either before or after its shaping into proper form. Alternatively, radioactive materials could be carried within the projectile, in which position the heat generated thereby would be transferred through the projectile walls to the formation.

Another well-known recovery technique is known as acidizing. Here, chemically active agents are introduced into the producing formation to attack and loosen the material in which the oil is entrapped. The same equipment which is used to introduce and disseminate the acid could distribute finely divided radioactive materials.

The well 17 in FIG. 1 illustrates the avenue through which the heated minerals are recovered. This well is provided with casing 18 and production tubing 19, both of which have perforations 20 at the level of the producing formation. The formation 11 in the vicinity of the well 17 shows the results of the introduction of radioactive pellets 21 and, at a lower level, small capsules 22 containing radioactive materials. These elements were introduced into the formation by the well known means discussed hereinabove prior to the completion of the well for production.

The results of yet another method of in situ heating are disclosed by the cementitious material 23 within the formation 11 below the level of the capsules 22. By entraining radioactive materials within a cement slurry and injecting such slurry into the formation, a broad distribution of isotopes is obtained. Upon the hardening of the cement, the radioactive material is fixed in place to eliminate the danger of migration.

It is to be understood that the various techniques disclosed in the vicinity of well 17 are for purposes of illustration, and it is not contemplated that they be used solely in the combination disclosed. The demands of a given reservoir will dictate the specific method or combination of methods which can best be employed.

The use of radioactive materials in liquid and gaseous form presents similar problems. As mentioned above, the inherently dangerous nature of the material in question renders it hazardous to introduce it into a formation in such condition that it could escape either through subsurface migration or through the heated petroleum produced from the formation. Therefore, my invention in its presently preferred form contemplates the use of liquid or gas isotopes in one of several applications in which they are confined. However, it well may be that in a suitable formation, the dangers mentioned above may be so slight as to render practical direct injection of the material.

Obviously, any hollow body capable of introduction into the producing formation could be filled with radioactive material in any form. Thus, elongated cylinders of a size up to several inches in diameter and many feet in length could be used, or small amounts of radioactive material could be confined within relatively small capsules or pellets.

An existing bore could be utilized to accommodate a large number of containers of radioactive material by enlarging that portion thereof which is within or near the mineral containing formation. Any of several existing techniques could be employed to expand the hole at a convenient point, and the containers would be of a size to pass through the smallest portion of the well thereabove. In this manner a substantial amount of radioactive material can be economically introduced into the area of primary utilization. This arrangement is illustrated in FIG. 1 in which well 24 has been enlarged within the formation 11. The elongated cylinders 25 are arranged about the enlarged portion 26, and the cement plug thereabove prevents well bore contamination.

In well 24 as in well 12, the radioactive material could be in solid form or in the containers 25. In a proper formation, the enlarged portion 26 could be filled with radioactive material and plugged, or filled with cement and subsequently drilled to provide a walled chamber for the material. Such innovations will readily occur to one skilled in the art.

FIGS. 3 and 4 disclose a type of capsule which is intended for use in my invention. As the radioactive shielding characteristics of materials vary over a wide range, it may be desired to provide a container 27 which is primarily of a metal or metal alloy 28 and has conveniently arranged portions such as the windows 29 which allow passage of a relatively large amount of radiation. This unit will result in the communication of heat to the formation by transfer from the radioactive material 30 therein to the metallic portions 28 of the capsule which absorb relatively large amounts of radioactive energy, and the communication of energy directly to the formation through the windows 29 which are of a material having less shielding effect.

A radioactive capsule offers several possibilities, one of which is the convenient and maintenance free heating of the bottom of a production tubing. Paraffin based oils are a source of considerable difficulty, for in many wells, large deposits quickly accumulate around the production inlets and stop the flow. A source of heat in this area will eliminate the necessity for frequent cleaning of the inlets. This of course is a specific example of the broad capabilities of my invention as disclosed herein.

The economics of the individual situations will determine the best type of radioactive material and the most convenient method for introduction into the earth. In many cases, it may be practical to communicate the heat generated by the radioactive materials through a non-contaminating liquid or gaseous medium. For example, the radioactive materials well might be confined in a simple heat exchanger, through or about which some readily available liquid, vapor or gas such as water, steam, oil or distillate would be circulated and heated to an elevated temperature. This heated medium then would be introduced into the producing formation, and the relative inefficiency of this process of indirect heating would be of little moment in view of the availability of extremely large amounts of heat-generating radioactive materials.

An example of an installation of this type is shown in FIG. 2 in which there is a well 31 extending from the surface of the ground 10 into the formation 11. Here the heat exchanger identified generally by reference numeral 32 is positioned near the wellhead. Suitable conduits 33 extend from the heat exchanger through a pump 34 and down the well 31 to a point of discharge 35 within the formation. Alternatively the discharge 35 could be closed and the conduit 33 connected to conduits 36 for return to the heat exchanger. In either event, radioactive material 37 in any form within the heat exchanger will heat the medium passing therethrough and/or therearound, and the heated medium will pass through the conduit system to heat the formation directly or through continuous circulation through the closed conduit system. It is apparent that either well 31 or a nearby well can be used to recover the heated minerals.

The heat exchanger could be located at or near the wellhead, or a suitable unit could be designed for insertion into the well. An example of the latter application would be an elongated annular or cylindrical unit containing radioactive material through which the heating medium would move on its way downward to the producing formation. An arrangement of this type also is illustrated in FIG. 2, in which well 38 contains a heat exchanger 39 having a housed unit 40 of radioactive material. A suitable medium from reservoir 41 circulated downwardly through the conduit 42 by pump 43 is discharged through outlet 44 into formation 11, and the heat which it acquires during its passage through the heat exchanger 39 is communicated to the formation. In such an installation where the heat exchanger is located within the well, the efficiency of the application of the heat to the mineral bearing formation will be substantially increased as compared to the installation exemplified by well 31, for the heat losses resulting from absorption of the heat by the casing and the overlying formation will be substantially reduced.

It may be desired to combine in series arrangement a heat exchanger at or near the surface and a second heat exchanger within the well. Larger volumes of circulation can thus be obtained, for the heating medium would be at an elevated temperature at the time of its arrival at the second heat exchanger. Safety might require that the surface heat exchanger be fired by any conventional fuel, and radioactive materials be employed only in the well bore.

Although the foregoing discussion has dealt with single well applications of my methods and apparatus, it will be apparent that the most efficient use thereof often will require that a heating pattern be developed for a particular formation involving numerous bores and perhaps a combination of several of the techniques disclosed herein. For example, about a central production bore, heating holes at intervals of from a few feet to several hundred feet may be drilled to most efficiently exploit the formation. Further, factors such as the depth and dip of the formation may dictate heating patterns of unique design.

In this regard, it is significant to note that the art of directional drilling of petroleum wells has advanced to such a point that it is possible to incline a hole from the vertical as much as ninety degrees. The advantages of directional holes for the most beneficial application of radioactive heat will be apparent.

Although the minerals heated in situ through the practice of my invention usually will be produced in liquid form, it is reasonable to suppose that in some instances the hydrocarbons will be vaporized. In such event, it is quite feasible to capture the vapor for subsequent condensation.

One skilled in reservoir or mining engineering can determine the peculiar needs of the various areas in which my invention is to be used, and I desire to protect by Letters Patent all such uses, adaptations and refinements thereof which fall within the scope of the following claim.

I claim:

The method of producing high viscosity minerals from subsurface formations by means of in situ heating thereof comprising the steps of introducing energy radiating radioactive materials into a slurry of cementitious materials, injecting the slurry into the subsurface formation containing the minerals through a bore in a concentration adequate to increase the temperature and correspondingly reduce the viscosity of the minerals through absorption of the radiated energy, and recovering the minerals thus freed from the formation through the bore.

References Cited by the Examiner

UNITED STATES PATENTS

| | | | |
|---|---|---|---|
| 2,220,205 | 11/1940 | Buckley | 166—5 |
| 2,476,136 | 7/1949 | Doll | 166—58 X |
| 2,670,802 | 3/1954 | Ackley | 166—60 X |

(References on following page)

UNITED STATES PATENTS

| | | | |
|---|---|---|---|
| 2,884,539 | 4/1959 | Swift | 250—106 |
| 2,906,680 | 9/1959 | Ruskin | 166—45 X |
| 2,914,124 | 11/1959 | Ripley | 166—57 |
| 2,951,535 | 9/1960 | Mihram et al. | 166—42.1 |
| 3,080,918 | 3/1963 | Natland | 166—11 |
| 3,085,957 | 4/1963 | Natland | 166—16 X |
| 3,126,055 | 3/1964 | Hanson | 166—39 |

OTHER REFERENCES

L. C. Uren: Petroleum Production Engineering (Exploitations), 2nd ed., McGraw-Hill, 1939, pp. 368–370.

R. L. Enright: "Radioactive Wastes May Become Future Oil-Recovery Tool," Oil and Gas Journal, July 13, 1959, pp. 72–74.

CHARLES E. O'CONNELL, *Primary Examiner.*

BENJAMIN HERSH, *Examiner.*